United States Patent
Zhao

(10) Patent No.: US 10,187,305 B2
(45) Date of Patent: Jan. 22, 2019

(54) SYSTEM AND METHOD FOR USING A PATH CONTROL ELEMENT AS A CENTRAL CONTROLLER FOR LOCAL PROTECTION OF LABEL SWITCHED PATH (LSP)

(71) Applicant: Futurewei Technologies, Inc., Plano, TX (US)

(72) Inventor: Qianglin Quintin Zhao, Boxborough, MA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/790,153

(22) Filed: Jul. 2, 2015

(65) Prior Publication Data

US 2016/0006609 A1 Jan. 7, 2016

Related U.S. Application Data

(60) Provisional application No. 62/020,270, filed on Jul. 2, 2014.

(51) Int. Cl.
*H04L 12/24* (2006.01)
*H04L 12/723* (2013.01)
*H04L 12/707* (2013.01)

(52) U.S. Cl.
CPC .......... *H04L 45/50* (2013.01); *H04L 41/0816* (2013.01); *H04L 45/22* (2013.01)

(58) Field of Classification Search
CPC ...... H04L 41/0806; H04L 41/12; H04L 45/50
See application file for complete search history.

(56) References Cited

U.S. PATENT DOCUMENTS

| 9,450,817 | B1* | 9/2016 | Bahadur | H04L 45/64 |
| 2008/0049751 | A1* | 2/2008 | Venkat | H04L 45/02 370/392 |
| 2009/0252033 | A1* | 10/2009 | Ramakrishnan | H04L 12/18 370/228 |
| 2012/0092986 | A1* | 4/2012 | Chen | H04L 45/22 370/228 |
| 2014/0003232 | A1* | 1/2014 | Guichard | H04L 67/16 370/230 |

(Continued)

OTHER PUBLICATIONS

Betts, M., et al., "SDN ARCH 1.0 Jun. 6, 2014," SDN Architecture, Issue 1.0, Open Networking Foundation, https://www.opennetworking.org/images/stories/downloads/sdn-resources/technical-reports/TR_SDN_ARCH_1.0_06062014.pdf, Jun. 2014, 68 pages.

(Continued)

*Primary Examiner* — Charles C Jiang
*Assistant Examiner* — Thad N Defauw
(74) *Attorney, Agent, or Firm* — Slater Matsil, LLP

(57) ABSTRACT

A path control element (PCE) is provided, including a processor and a non-transitory computer readable storage medium coupled to the processor. The storage medium stores programming for execution by the processor, wherein the programming, when executed by the processor, configures the PCE to receive a request for a path of a unicast or multicast label switching path (LSP), determine a primary path and a secondary/local protection path through a plurality of nodes in a label switched network, and provide the primary path and the secondary/local protection path to the plurality of nodes.

22 Claims, 7 Drawing Sheets

(56) References Cited

U.S. PATENT DOCUMENTS

2014/0341222 A1* 11/2014 Filsfils .................. H04L 45/507
370/395.5
2015/0117203 A1* 4/2015 Filsfils .................. H04L 47/122
370/235
2015/0271102 A1* 9/2015 Antich .................. H04L 47/805
370/230

OTHER PUBLICATIONS

Sivabalan, S., et al., "PCEP Extensions for Segment Routing," Network Working Group, Internet-Draft, Intended Status: Standards Track, Oct. 16, 2013, 18 pages.

Zhao, Q., et al., "The User Cases for Using PCE as the Central Controller (PCECC) of LSPs," PCE Working Group, Internet-Draft, Intended Status: Standards Track, Oct. 21, 2013, 13 pages.

Zhao, Q., et al., "PCEP Procedures and Protocol Extensions for Using PCE as a Central Controller (PCECC) of LSPs," PCE Working Group; Internet-Draft; Intended Status: Standards Track, Feb. 2014, 20 pages.

Zhao, Q., et al., "PCEP Procedures and Protocol Extensions for Using PCE as a Central Controller (PCECC) of LSPs," PCE Working Group; Internet-Draft; Intended Status: Standards Track, Nov. 2013, 20 pages.

\* cited by examiner

SYSTEM AND METHOD FOR USING A PATH CONTROL ELEMENT AS A CENTRAL CONTROLLER FOR LOCAL PROTECTION OF LABEL SWITCHED PATH (LSP)

This application claims the benefit of U.S. Provisional Application No. 62/020,270, filed on Jul. 2, 2014, entitled "System and Method for Using a Path Control Element as a Central Controller for Local Protection of Label Switched Path (LSP)," which application is hereby incorporated herein by reference

TECHNICAL FIELD

The present invention relates to a system and method for using a path control element (PCE) as a central controller for local protection of Label Switched Path (LSP) in a Multiprotocol Label Switching (MPLS) network.

BACKGROUND

Multiprotocol Label Switching (MPLS) networks are an attractive alternative for use in very high speed backbone networks. On entering the network, data packets for a particular link are assigned a label. Packet-forwarding decisions are made solely on the contents of this label without the need to examine the packet itself. This allows creation of end-to-end circuits across any type of transport medium, using any protocol. The primary benefit is to eliminate dependence on a particular open systems interconnection (OSI) model data link layer technology, such as Asynchronous Transfer Mode (ATM), Frame Relay, Synchronous Optical Networking (SONET) or Ethernet, and eliminate the need for feeder networks to satisfy different types of traffic.

MPLS networks often include thousands of nodes (switches, routers, etc.) and determining the best routing is a great challenge. Not only must the path attached to a label be as fast as possible, it must account for other traffic and for disabled loads or links and issues such as quality of service. Currently, techniques such as traffic engineering fast reroute (TE FRR) or loop free alternative (LFA) are used for point to point (P2P) label switch path's (LSP's) fast reroute (FRR). With the complexity of MPLS signaling, the TE FRR or LFA solutions are not easy for users to deploy and maintain. By using the PCE controller to calculate and program the network nodes for the primary and protect/secondary LSP path, the local protection services for LSPs are provided through the centralized system without the complexity of the distributed MPLS signaling.

SUMMARY

A path control element (PCE) is provided, including a processor and a non-transitory computer readable storage medium coupled to the processor. The storage medium stores programming for execution by the processor, wherein the programming, when executed by the processor, configures the PCE to receive a request for a path of a unicast or multicast label switching path (LSP), determine a primary path and a secondary/local protection path through a plurality of nodes in a label switched network, and provide the primary path and the secondary/local protection path to the plurality of nodes.

A method for local protection is provided, including a path control element (PCE) receiving a request for a path of a unicast or multicast label switching path (LSP), the PCE determining a primary path and a secondary/local protection path through a plurality of nodes in a label switched network, and the PCE providing the primary path and the secondary/local protection path to the plurality of nodes.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
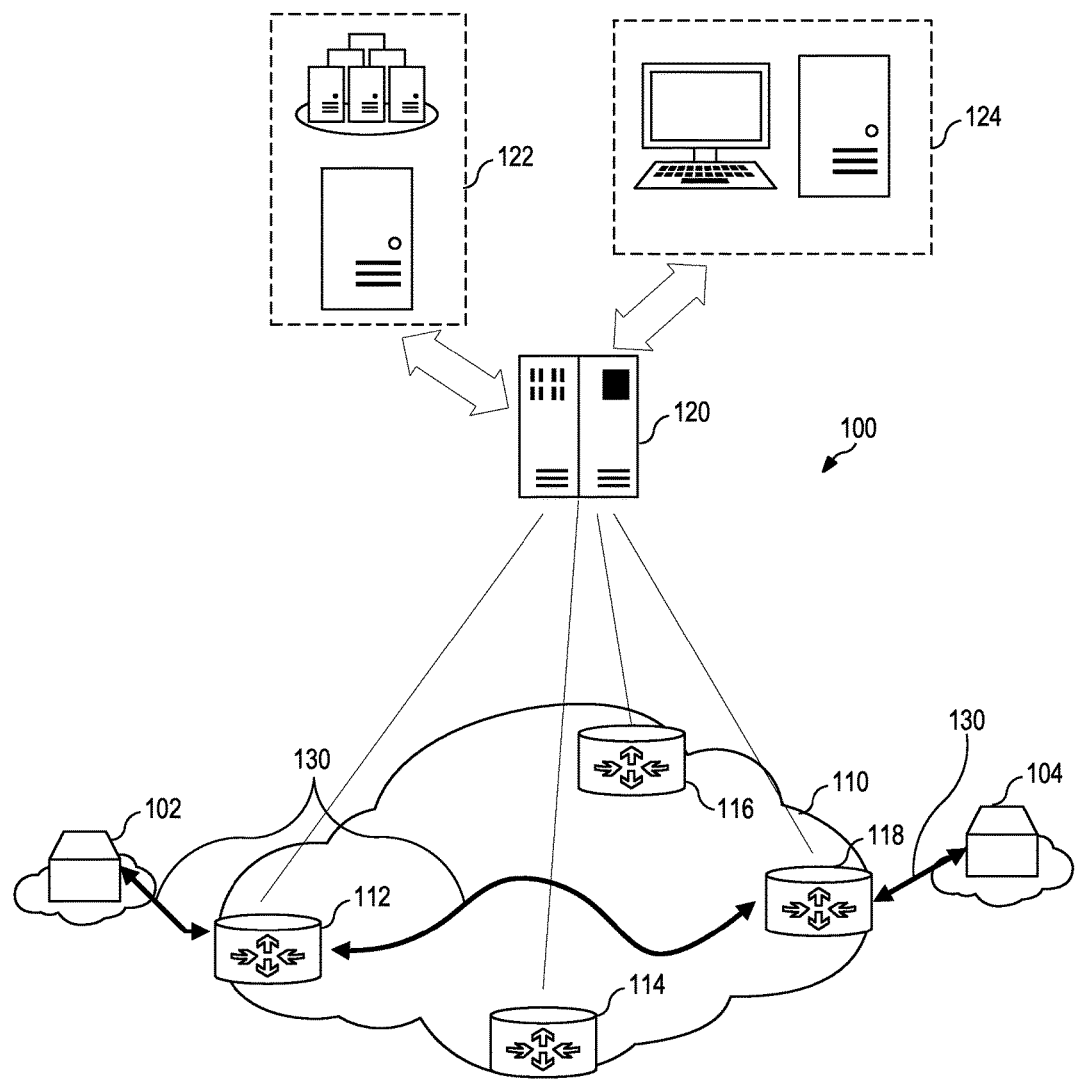
FIG. 1 is an illustration of an embodiment of invention label switched network.

FIG. 1 is an illustration of an embodiment of a label switched network 100. The label switched network 100 includes a multiprotocol label switching (MPLS) network 110 and a path control element (PCE) 120. The label switched network 100 can further include a traffic collector analyzer 122 and an operation support system (OSS) 124. In the embodiment shown, the PCE 120 is communicatively coupled to the MPLS network 110, the traffic collector analyzer 122, and the OSS 124. Devices 102 and 104 can communicate with the MPLS network 110 and in some examples can communicate with each other through the MPLS network 110. Device 102 connects to label edge router (LER) 112 to initiate a path 130 through MPLS network 110. The path exits MPLS 110 at LER 118 and is provided to destination point device 104. At least some of the plurality of nodes comprise routers.

A typical MPLS network will include many edge routers, such as LERs 114 and 116, to provide various connections to outside networks. In MPLS network 110, each LER and all of the internal nodes (not shown) of the network are communicatively coupled by communication links to path control element (PCE) 120. A path computation element protocol (PCEP) is used for communication between a path computation client (PCC) (e.g., LERs 112, 114, 116 and 118) and PCE 120. Additional embodiments may include two or more PCEs.

PCE 120 computes paths for MPLS traffic engineering label-switched paths (LSPs) (MPLS-TE LSPs) based on various constraints and optimization criteria. In this embodiment, PCE 120 is a platform of a software defined network (SDN) including virtual machines for the PCE functionality itself and for virtualization of additional functionality from the MPLS network nodes. In an embodiment, communication from PCE 120 to the elements in MPLS network 110 uses the OpenFlow standard (see SDN Architecture, Issue 1 https://www.opennetworking.org/images/stories/downloads/sdn-resources/technical-reports/TR_SDN_ARCH_1.0_06062014.pdf, which is hereby incorporated by reference into this specification in its entirety). Use of a SDN structure provides scalability for this embodiment to nearly any size MPLS network. In addition, PCE 120 is connected using a representational state transfer (REST) application interface (known as a RESTful API), to communicate with traffic collector analyzer 122 and operation support system (OSS) 124.

Figure 2:
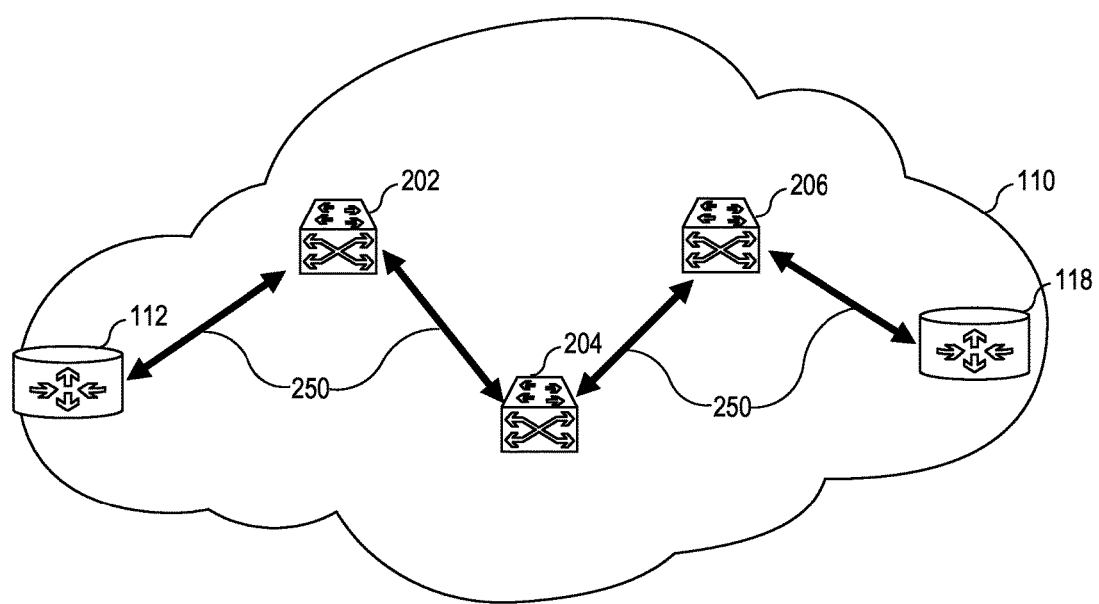
FIG. 2 is an illustration of a multiprotocol label switching (MPLS) network including representative internal nodes.

FIG. 2 is an illustration of the MPLS network 110 including representative internal nodes 202, 204, and 206. A link request (e.g., a request for a tunnel, VPN, etc.) arrives at LER 112 that is destined for LER 118. PCE 120 is the central controller (PCECC) for MPLS 110. PCE 120 is used for the node and link adjacency advertisements. PCE 120 also computes and downloads the secondary/local protection path to each node. Local protection is discussed further with regard to FIGS. 4-6. Given the starting point (LER 112) and destination (LER 118), the route 250 is determined by data in the label information base (LIB) (not shown) in LER 112. This LIB information is provided to LER 112 by PCE 120 and is constantly updated. A label indicating route 250 is attached to all traffic indicating a primary route. As shown in FIG. 2, this route goes from LER 112 to node or label switch router (LSR) 202, LSR 204, LSR 206 and arrives at LER 118. Of course, route 250 is greatly simplified for illustration purposes. As a result, the PCE 120 calculates a primary path and a secondary/local protection path for the plurality of nodes and distributes the primary path and the secondary/local protection path to the plurality of nodes.

An embodiment utilizes PCE 120 to enable each PCC client to receive the primary and secondary (local protection) unicast LSP information and multicast LSP information, which are set up from the centralized PCE both for end-to-end protection and local protection. The centralized PCE is used as the facility to calculate/setup/distribute the primary and secondary LSP.

Figure 3:
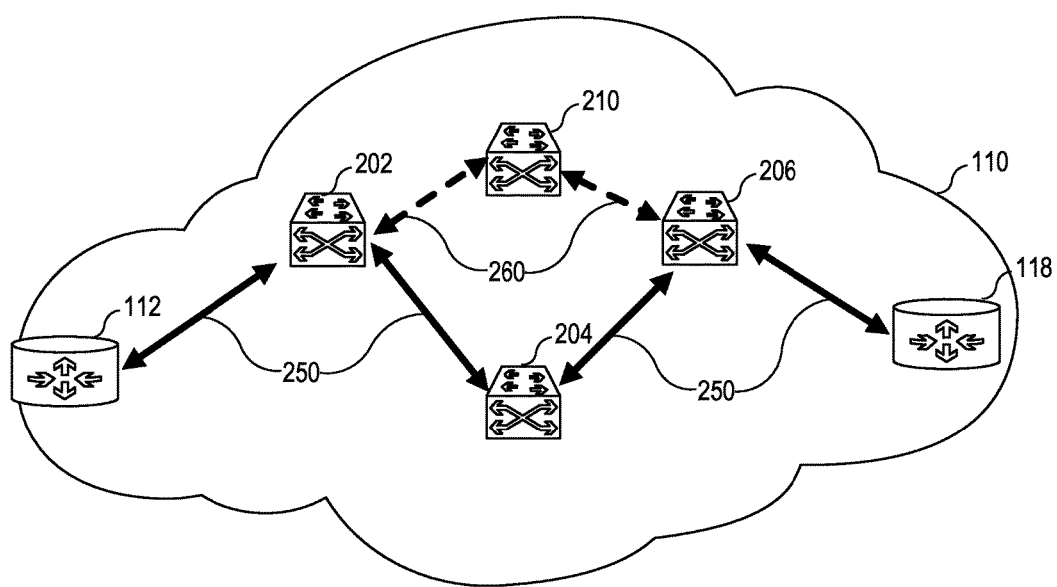
FIG. 3 shows the label switch path (LSP) of FIG. 2 with the addition of secondary routing based on local protection.

FIG. 3 shows the LSP of FIG. 2 with the addition of secondary routing based on local protection. That is, FIG. 3 includes local protection route 260 using LSR 210. Its purpose is to maintain the flow of traffic in the event of equipment failure, software issues, or excess congestion. In FIG. 3, the local protection route 260 can be used if an issue occurs at LSR 204 or with any of its links.

Figure 4:
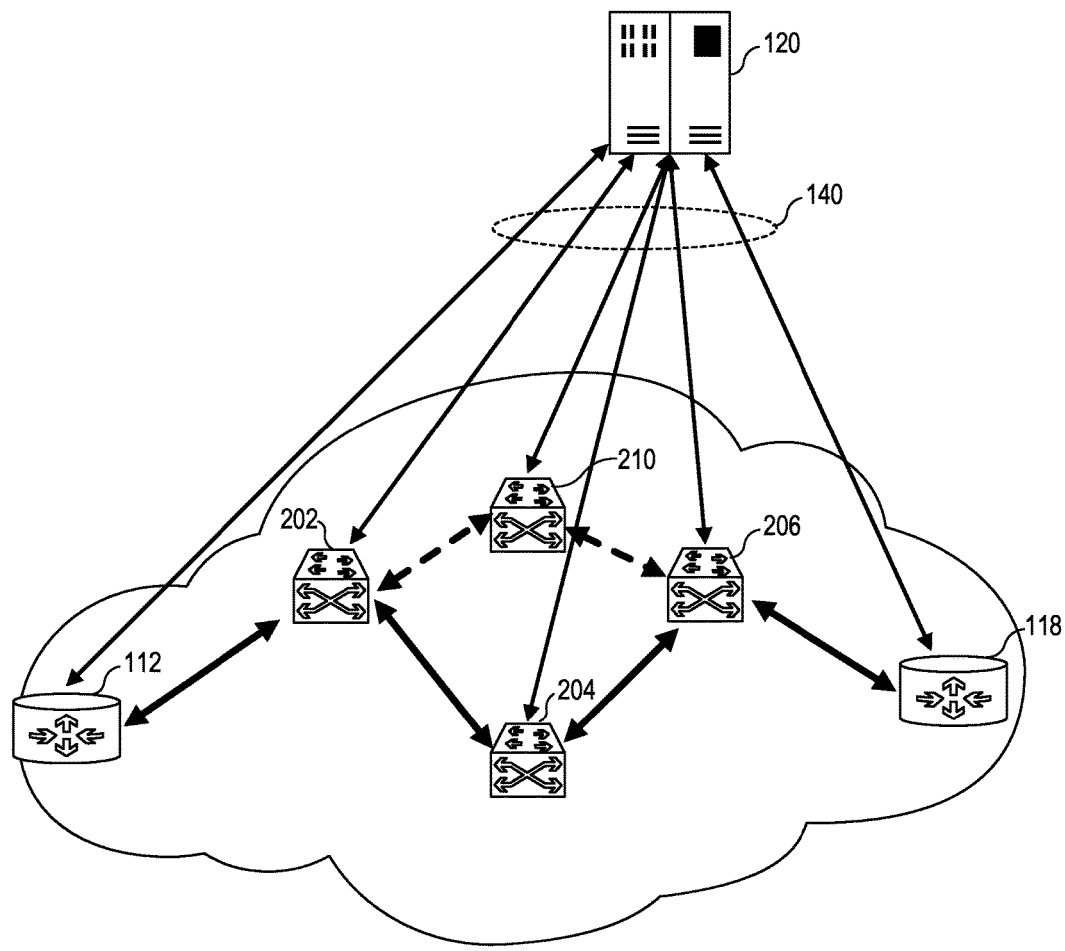
FIG. 4 is an illustration showing the operation of local protection according to the present embodiment.

FIG. 4 is an illustration showing the operation of local protection according to the present embodiment. Using communication links 140, PCE 120 transmits a primary path and a secondary/local protection path to every node of network 110. Also, using communication links 140, each node sends status and traffic information to PCE 120. Using this information, PCE 120 employs traffic collector analyzer 122 to update local protection paths on a regular basis. Although FIG. 4 shows only one local protection path 260, PCE 120 may calculate a local protection path for every node in the MPLS network. By moving the routing and local protection calculation to PCE 120, overhead traffic on MPLS network 110 is greatly reduced. With other techniques, each node must broadcast traffic and status information to all nodes to exchange the necessary information between each node. With this task offloaded to PCE 120, the network does not need to advertise the link adjacency to each node in the network. The nodes on the network are not required to gather the necessary information and calculate primary and secondary paths. With communication connections 140, information is transmitted faster to PCE 120 than to most nodes on the network (unless the node happens to be adjacent to the transmitting node) and the information does not burden network communication resources. An additional advantage is facilitating the transition to software defined networks (SDNs). The telecommunications industry is moving toward the use of SDNs. Moving local protection determinations onto PCE 120 is a step toward SDN-based MPLS networks because it removes the local protection function from local hardware.

The connections of FIG. 4 comprise point-to-point (P2P) connections. From a local protection perspective, the connections of FIG. 4 are relatively simple. A much more complex problem occurs in multicast (point to multipoint (P2MP)) or multipoint to multipoint (MP2MP) connections. These types of connections are becoming more important because they are often used in enterprise-level virtual private networks (VPN), entertainment content distribution, and various teleconferencing scenarios.

Figure 5:
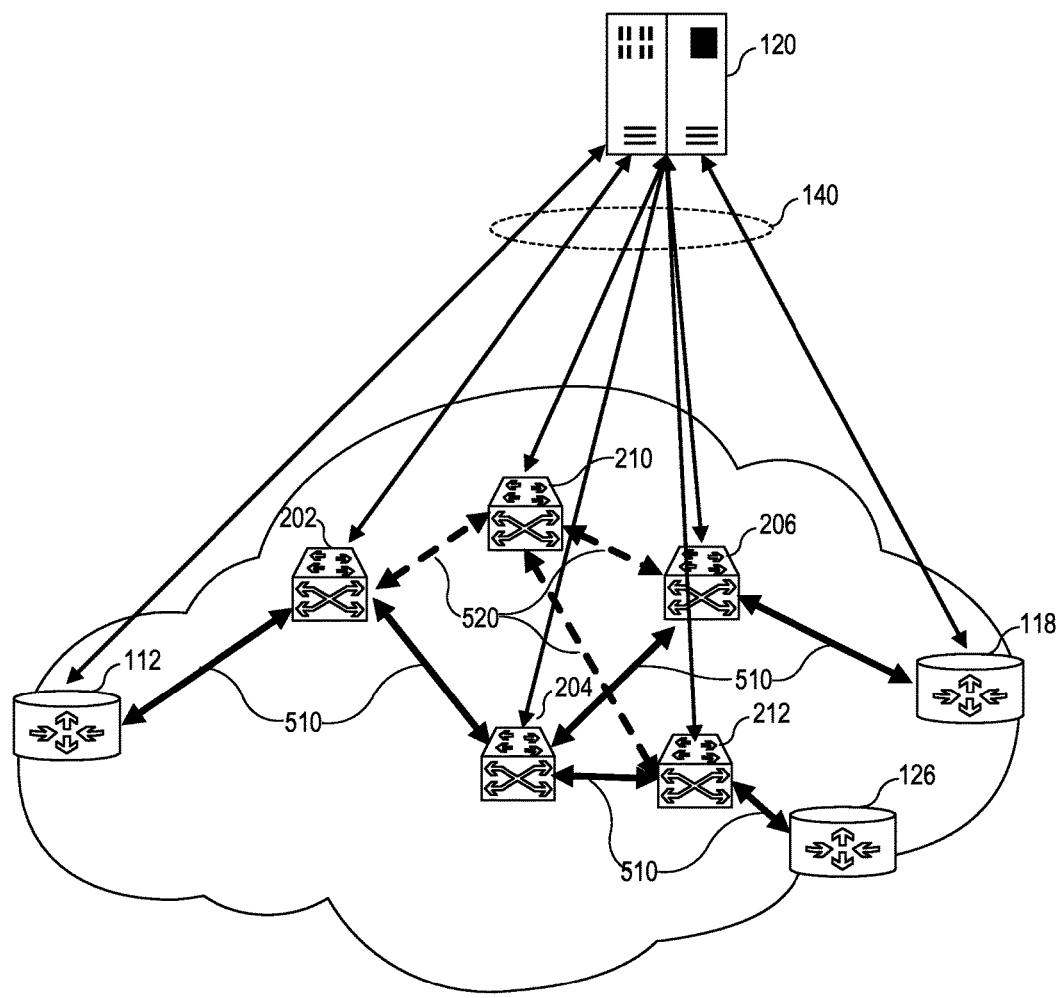
FIG. 5 is an illustration showing an embodiment of the invention that provides effective local protection for a multicast connection.

FIG. 5 is an illustration showing an embodiment of the invention that provides effective local protection for a multicast connection. FIG. 5 shows a P2MP connection. When the head end at LER 112 of a LSP tunnel or ingress node of the LSP requests a path of the multicast LSP flow for a specific multicast tree, PCE 120 replies to the request with a primary path 510 and a local protection 520 path. Both the primary 510 and local protection 520 paths are specified through two disjoint paths including or consisting of the node and link adjacencies from the root to each leaf of the multicast tree. The primary explicit path 510 begins at LER 112 and ends at both LER 118 and LER 126. The primary path is from LER 112 to LSR 202 to LSR 204. Here the path splits to reach multiple destinations. From LSR 204, the path splits to LSR 206 and LSR 212. The paths continue to LER 118 and LER 126, respectively.

Complications can occur if there is some malfunction at a node where the paths split. In the example illustrated in FIG. 5, if there is a problem with LSR 204, it is not only necessary to use a local protection path to circumvent the problem, it also is necessary for the split paths to merge back into the primary paths downstream from LSR 204. An embodiment provides a signaling mechanism among the present PCE 120 and PCCs, both for resource reservation and LSP distribution for primary and secondary unicast and multicast LSP. With the present embodiment, PCE 120 includes data on the entire topology of MPLS network 110 and data on the traffic and status of all nodes. When the P2MP link is established, PCE 120 calculates local protection for all nodes, including those nodes with split paths. In the example of FIG. 5, PCE 120 establishes a local protection path for LSR 204 through LSR 210 that includes a split path from LSR 210 to LSR 206 and LSR 212. The local protection path through LSR 210 will merge with the primary path at both LSR 206 and LSR 212.

Figure 6:
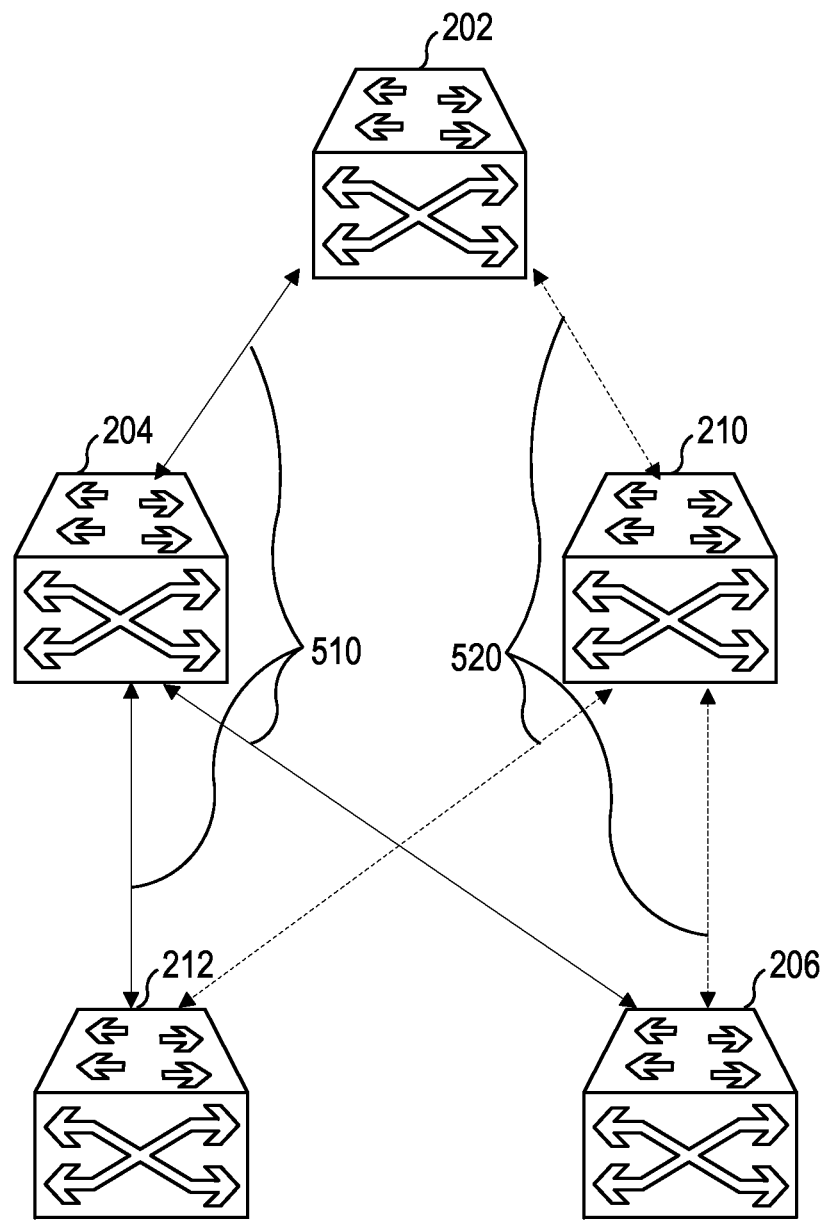
FIG. 6 more clearly illustrates the relationship between primary path and secondary/local protection path of FIG. 5.

FIG. 6 more clearly illustrates the relationship between primary path 510 and local protection path 520 of FIG. 5. While the secondary path 520 includes a different routing in order to replace the node 204, the secondary/local protection path 520 still provides paths between node 202 and the two nodes 206 and 212.

Figure 7:
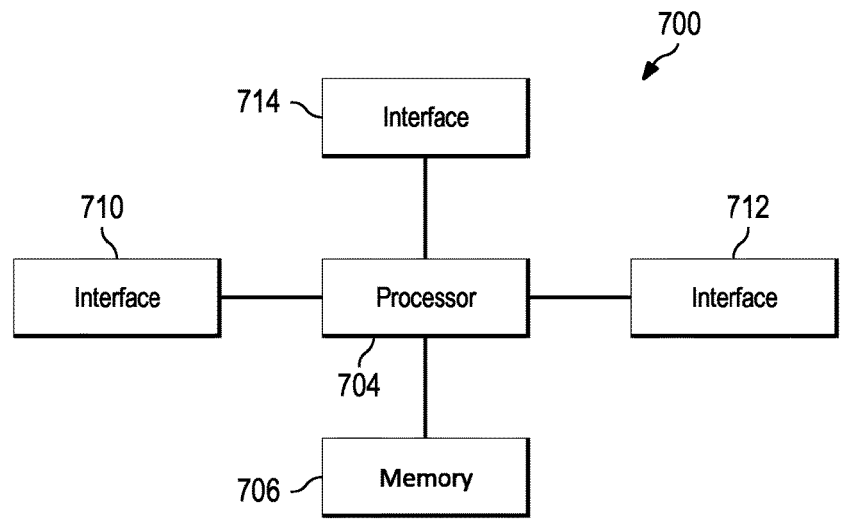
FIG. 7 illustrates a computing platform that may be used for implementing, for example, the devices and methods described herein, in accordance with an embodiment.

FIG. 7 illustrates a computing platform that may be used for implementing, for example, the devices and methods described herein, in accordance with any embodiment. FIG. 7 is a block diagram of an embodiment processing system 700 for performing local protection methods described herein. FIG. 7 shows a use of a PCE as a PCECC for local protection of a LSP. As shown, the processing system 700 includes a processor 704, a memory 706, and interfaces 710, 712, and 714, which may (or may not) be arranged as shown in FIG. 7. The processor 704 may be any component or collection of components adapted to perform computations and/or other processing related tasks. In a virtualized network, processor 704 may consist of thousands or processing devices, such as so-called "blade" computers. Memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. In some embodiments, one or more of the interfaces 710, 712, 714 connects the processing system 700 to a transceiver adapted to transmit and receive signaling over a wired or wireless network, such as a telecommunications network. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.). The memory 706 stores a software program that, when executed, configures the processing system 700 to calculate/determined a primary path and a secondary/local protection path for a plurality of nodes and distributes the primary path and the secondary/local protection path to the plurality of nodes.

In some embodiments, the processing system 700 is included in a network device that is accessing, or otherwise part of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
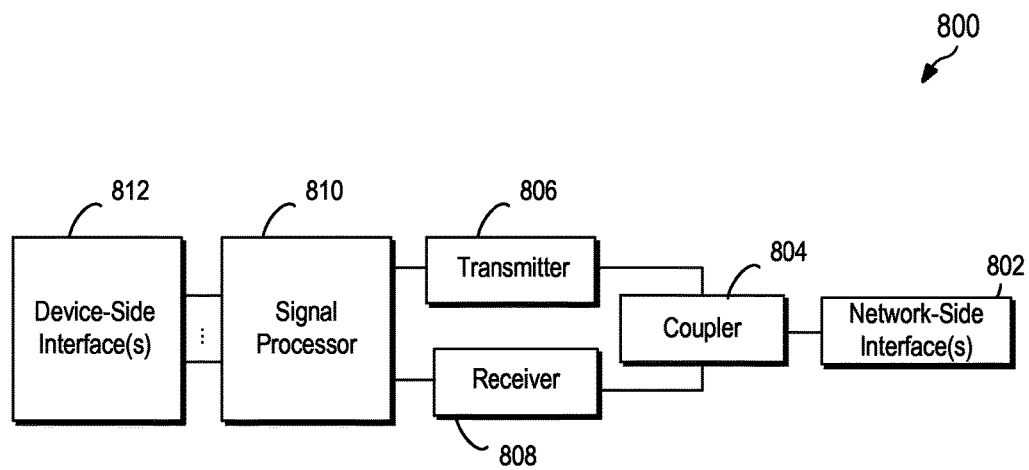
FIG. 8 illustrates a telecommunications system, in which one or more of the embodiments of the disclosure may be implemented.

FIG. 8 illustrates a telecommunications system in which one or more of the embodiments of the disclosure may be implemented. FIG. 8 is a block diagram of a transceiver 800 adapted to transmit and receive signaling over a telecommunications network. The transceiver 800 may be installed in a host device and some or all of its components may be virtualized. As shown, the transceiver 800 comprises at least one network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband or informational signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband or informational signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 600, local area network (LAN) ports, etc.).

The transceiver 800 in some examples receives a path request from a component or components of a network, such as a MPLS network for example. The transceiver 800 in some examples receives a request for a path of a unicast or multicast label switching path (LSP). The transceiver 800 generates and transfers a primary path and a secondary/local protection path for a plurality of nodes of the network and distributes the primary path and the secondary/local protection path to the plurality of nodes.

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A path control element (PCE) comprising:
a non-transitory memory storage comprising instructions; and
a processor in communication with the non-transitory memory storage, wherein the processor executes the instructions to:

regularly receive, directly from each of a plurality of nodes comprising a plurality of label edge routers (LERs) and a plurality of internal nodes, updated status and traffic information in a label switched network, the PCE being separate from the plurality of nodes;

receive a request, from a path computation client (PCC), for a path of a unicast or multicast label switching path (LSP); and transmit directly, to each of the plurality of nodes, a primary path and a secondary/local protection path in the label switched network, wherein the primary path and the secondary/local protection path are determined in response to the request from the PCC and in accordance with the updated status and traffic information.

2. The PCE of claim 1, wherein the processor executes the instructions to calculate the primary path and the secondary/local protection path in response to a request from a first label edge node.

3. The PCE of claim 1, wherein the PCE comprises a PCE central controller (PCECC).

4. The PCE of claim 1, wherein the PCE comprises a software defined device in a virtual machine.

5. The PCE of claim 1, wherein the label switched network comprises a multiprotocol network.

6. The PCE of claim 1, wherein the PCE communicates with the plurality of nodes using a path computation element protocol (PCEP).

7. The PCE of claim 1, wherein the PCE communicates with the plurality of nodes using a software defined network (SDN) protocol.

8. The PCE of claim 1, wherein the primary path and the secondary/local protection path provide a point to point (P2P) path, a point to multi-point (P2MP) path, or a multi-point to multi-point (MP2MP) path.

9. The PCE of claim 1, wherein a subset of the plurality of internal nodes comprise routers.

10. The PCE of claim 8, wherein the processor executes the instructions to compute and download a secondary/local protection path to each node in a multicast tree.

11. The PCE of claim 8, wherein the primary path and the secondary/local protection path are explicit, disjoint paths including node and link adjacencies from a root to each leaf of a multicast tree.

12. A method for local protection comprising:

regularly receiving, by a path control element (PCE), directly from each of a plurality of nodes comprising a plurality of label edge routers (LERs) and a plurality of internal nodes, updated status and traffic information in a label switched network, the PCE being separate from the plurality of nodes;

receiving a request, by the PCE, from a path computation client (PCC), for a path of a unicast or multicast label switching path (LSP); and transmitting directly, by the PCE, to each of the plurality of nodes, a primary path and a secondary/local protection path in the label switched network, wherein the primary path and the secondary/local protection path are determined in response to the request from the PCC and in accordance with the updated status and traffic information.

13. The method of claim 12, wherein the PCE calculates the primary path and the secondary/local protection path in response to a request from a first label edge node.

14. The method of claim 12, wherein the PCE comprises a PCE central controller (PCECC).

15. The method of claim 12, wherein the PCE comprises a software defined device in a virtual machine.

16. The method of claim 12, wherein the label switched network comprises a multiprotocol network.

17. The method of claim 12, wherein the PCE communicates with the plurality of nodes using a path computation element protocol (PCEP).

18. The method of claim 12, wherein the PCE communicates with the plurality of nodes using a software defined network (SDN) protocol.

19. The method of claim 12, wherein the primary path and the secondary/local protection path provide a point to point (P2P) path, a point to multi-point (P2MP) path, or a multi-point to multi-point (MP2MP) path.

20. The method of claim 12, wherein a subset of the plurality of internal nodes comprise routers.

21. The method of claim 19, further comprising the PCE computing and downloading a secondary/local protection path to each node in a multicast tree.

22. The method of claim 19, wherein the primary path and the secondary/local protection path are explicit, disjoint paths including node and link adjacencies from a root to each leaf of a multicast tree.

* * * * *